Patented Feb. 10, 1931

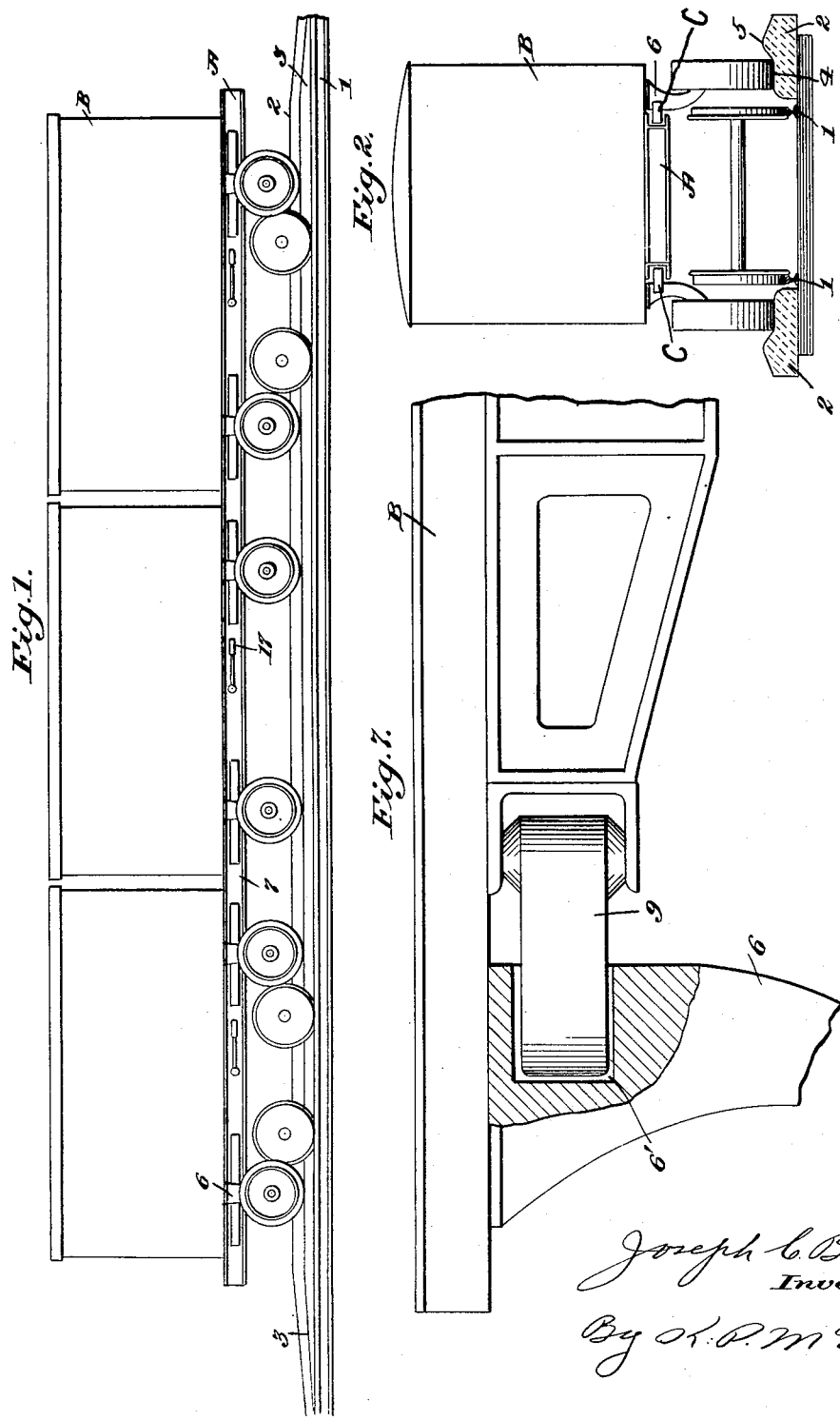

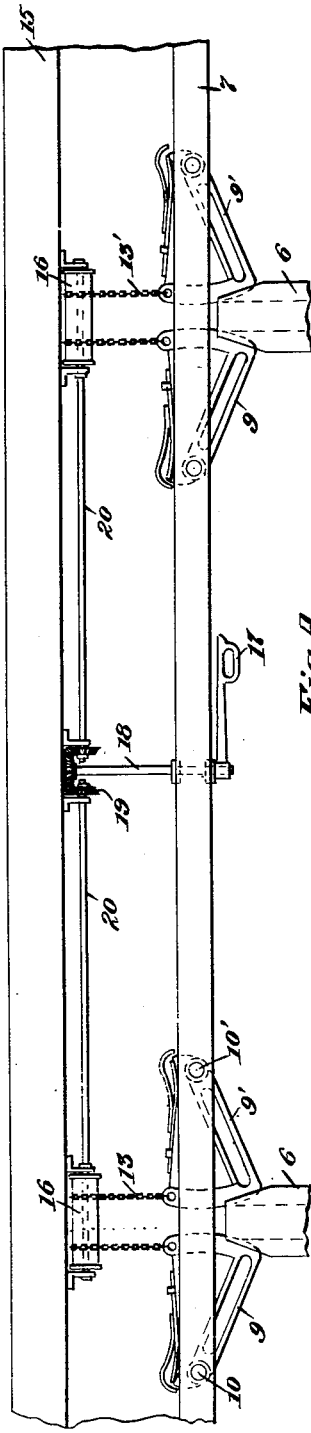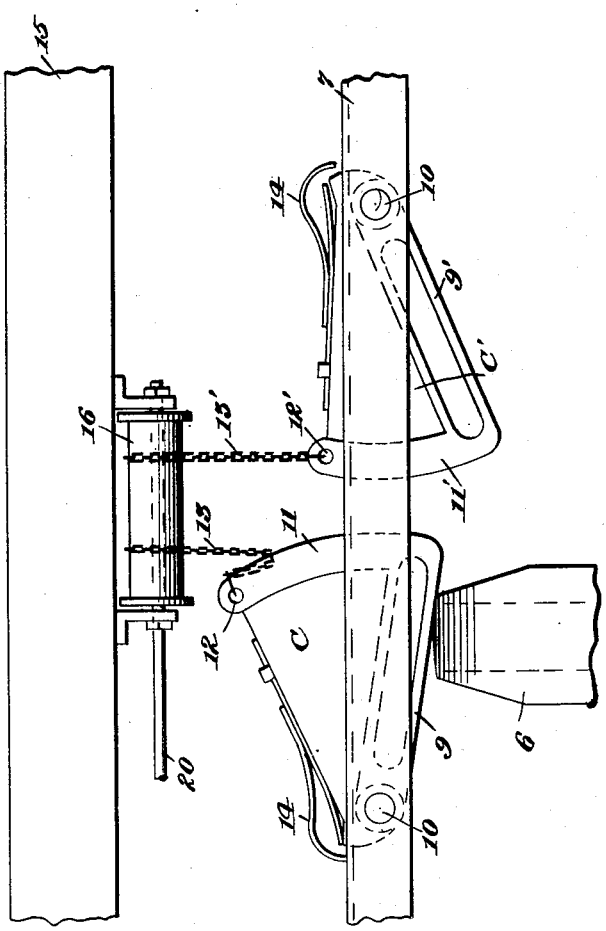

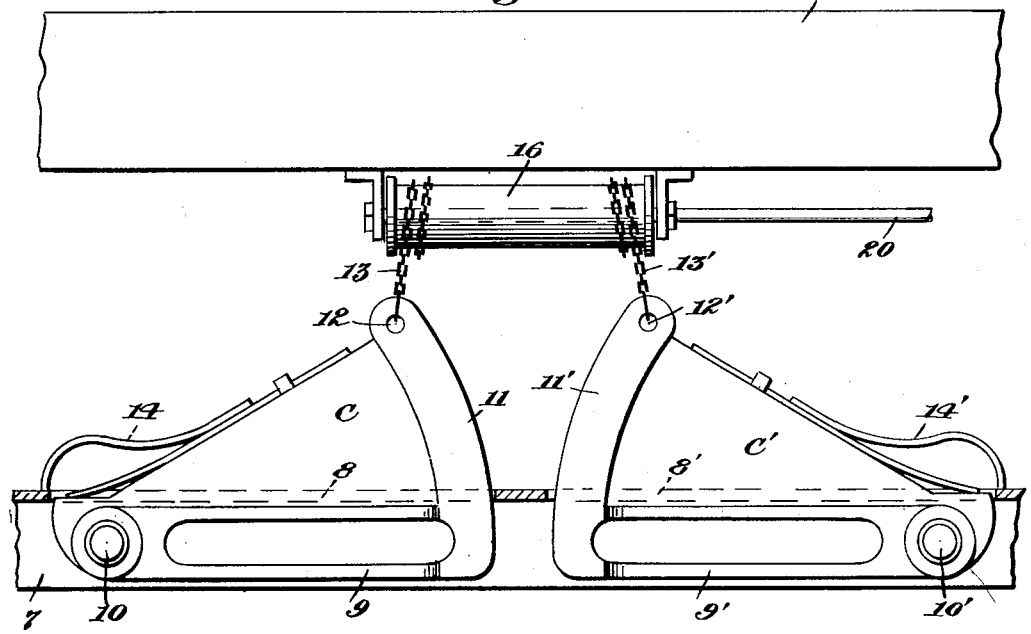
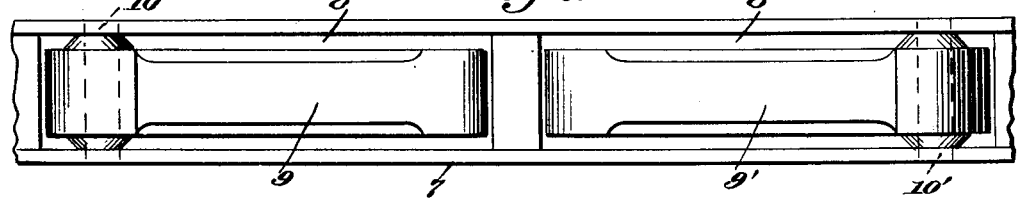

1,792,357

UNITED STATES PATENT OFFICE

JOSEPH CLAYBAUGH BONNER, OF TOLEDO, OHIO

VEHICLE FASTENING OR LOCKING DEVICE

Application filed October 18, 1929. Serial No. 400,582.

My invention relates to vehicle fastening or locking means, and more particularly has reference to a construction for locking and fastening together a road or carried vehicle and a carrier vehicle such as a standard railroad flat car.

In transporting freight one of the main problems is the loading and unloading of the goods. Usually the freight is delivered in a road wagon to the freight terminal and there the freight is unloaded and packed in the freight cars. When the freight is delivered to its freight terminal destination, it is then transferred in bulk to road vehicles and delivered to its ultimate destination. In my prior Patent No. 1,280,140, October 1, 1918, I have shown and described a transportation system in which the road wagon is of wider gage than the standard freight car, and in which the arrangement and combination of the road wagon and freight car are such that the freight car may be straddled by the road vehicle and the road vehicle elevated to a point where its wheels are above the track level for transportation. Usually several road vehicles are loaded upon one flat freight car and many such road vehicles are loaded upon a train.

In my companion application filed on even date herewith for "Vehicle aligning, elevating and storing means", I have shown and described a sub-track construction in association with the outside of each of a pair of parallel railroad tracks, the sub-track of said application comprising a substantially flat road vehicle wheel tread surface elevated above the railroad track, a guide member at the outer edge of the tread surface, and inclined runways so that a road or carried vehicle may be driven on to the tread surfaces. The construction of the sub-tracks is such that a road vehicle or vehicles may be positioned and maintained astraddle a pair of railroad tracks and slightly elevated above the same to permit a carrier vehicle, such as a flat freight car, to be driven beneath the carried vehicles supported upon the sub-tracks, the latter thereby serving as an effective means for positioning the carried vehicles astraddle the carrier car. The carried vehicles and the carrier car are then fastened together so that the former may be hauled off the sub-tracks by the latter, and when the thus entrained carried vehicles are drawn beyond the limits of the sub-tracks, the same rest upon and remain supported astraddle the carrier car with their wheels suspended free of the ground.

My present invention has for an object the provision of means for automatically locking the road vehicles to the carrier car when the latter is driven beneath the road vehicles supported on the elevated sub-tracks, and also for readily unfastening the carrier and carried vehicles when the point of freight destination is reached; and my invention comprises more particularly spring actuated locking members disposed lengthwise of the carrier car for engaging the wheel supporting pedestals of the carried vehicles, as well as hand operated mechanism for disengaging the locking arrangement of the spring pressed arms with the carried vehicle wheel pedestals.

In the accompanying drawings illustrating specific embodiments of my invention:

Fig. 1 is an elevational view of three road or carried vehicles in straddled position across and locked to a railroad carrier car, the wheels of the former being supported upon the sub-tracks of my companion application referred to, and the wheels of the latter supported upon railroad tracks;

Fig. 2 is a cross sectional view further showing the relationship of carried and carrier vehicles illustrated in Fig. 1;

Fig. 3 is a plan view showing the novel means of my invention in locking engagement with the wheel pedestals of a road vehicle;

Fig. 4 is a plan view similar to Fig. 3 and showing a wheel pedestal moving into locking engagement;

Fig. 5 is a plan view showing the locking means in retracted position;

Fig. 6 is an end view of the locking means; and

Fig. 7 illustrates a modified construction of wheel pedestal.

Referring more particularly to the drawings wherein like reference characters designate similar parts throughout the several views, the carrier vehicle A is shown as a railroad flat car moving upon the parallel railroad tracks 1, and the road vehicles B are shown as supported on the elevated sub-tracks 2, the latter having inclined runways 3, elevated tread surfaces 4, and guide portions 5, said sub-tracks being more fully shown and described in my companion application referred to and forming no part of the present invention. By reason of the wheel pedestals 6 of the road vehicle, the usual cross axle construction is eliminated to thereby provide clearance and permit the road vehicle to straddle the carrier car.

The longitudinal beam or channel iron side sill 7 of the usual railroad flat car frame structure is preferably provided along its length with pairs of recesses 8 and 8', through which are adapted to move inwardly and outwardly of the car pairs of wheel pedestal engaging members generally designated as C and C'. The locking or wheel pedestal engaging members C and C' are substantially V-shaped as shown and are pivoted in side sill 7 as shown at 10 and 10' adjacent opposite ends of recesses 8 and 8'. The locking members comprise straight portions 9 and 9' projectable outwardly from the car through recesses 8 and 8' at an angle from pivot points 10 and 10' and curved portions 11 and 11' extending inwardly of the car. The inner extremities of the sections 11 and 11' are provided with openings 12 and 12' respectively for attachment to chains or cords 13 and 13'. Steel leaf springs 14 and 14' or any other suitable spring devices cooperate with the engaging members C and C' respectively and act to force and hold the same outwardly projected through recesses 8 and 8' in the side sill 7. A center longitudinal sill 15 is fixed to carrier car A and suitably bolted thereto are winding drums or reels 16, to which the chains 13 and 13' are attached. The winding drums 16 are actuated by rotation of hand lever 17, through shaft 18, gearing 19, and shafts 20. Obviously the drums 16 may be fixed to other parts of the car than the center sill.

The wheel pedestals 6 of road vehicles B taper away toward their outer edges as shown in Figs. 3 and 4, and, as best illustrated in Fig. 7, may, although not necessarily, be provided with recesses 6' on both sides for reception of the locking members.

In Fig. 3 I have shown only one side of the car but it will be understood that the other side thereof is substantially similar, the shaft 18 extending through sill 15 and operating shafts and winding drums similar to those indicated at 20 and 16 respectively.

From the foregoing description of the construction, it is believed that the manner of operation is apparent. The road vehicles loaded with freight having been driven on to the elevated sub-tracks 2, a railroad flat car provided with my novel locking means is driven thereunder. By reason of spring members 14 and 14' and by their spring action in unwinding of chains 13 and 13' on drums 16, the engaging members C and C' are maintained partially extended through the recesses in side sill 7. Referring to Fig. 4 and assuming that the carrier car is moving from right to left, it will be seen that wheel pedestal 6 slides along arm 9 and pushes member C inwardly of the car bottom against the action of spring 14 and when pedestal 6 passes the extremity of arm 9, the member C is again pressed outwardly by spring 14 so that the pedestal is engaged between the curved portions 11 and 11' as shown in Fig. 3. By continued movement of the carrier car, the road vehicles, by engagement of their wheel pedestals with successive locking members, move therewith to the end of the elevated sub-tracks 2 when the entire weight of the road vehicles is lowered upon the carrier car, the wheels of the former riding free of the ground, and the arms 11 and 11' holding their engagement with the wheel pedestals 6. At the point of destination of the freight, the wheels of the road vehicles ride on to additional sub-tracks 2, and the arms 11 and 11' are released from engagement with pedestals 6 by rotation of winding drums 16 through hand lever 17, shaft 18, gearing 19, and shafts 20 to thereby wind chains 13 and 13' upon the drums and pull the engaging elements C and C' inwardly of the car against the outwardly acting springs 14 and 14'. The road vehicles and carrier car are now free of engagement so that the latter may be driven from beneath the former and the road vehicles left standing upon the elevated sub-tracks.

The recesses 6' in the pedestals 6 and the positioning of the locking arms therein serve to check vertical movement of the loaded carried vehicles should the freely hanging wheels strike an obstruction on the road. The provision of such recesses, however, is not essential and may be dispensed with as it may be desirable to permit free vertical movement of the vehicle in the event that a wheel thereof strike an obstruction.

It will of course be understood that the locking members C and C' need not necessarily work through recesses in the side sill of the car as illustrated, but that they may be positioned in the top of the car or at any other point where they may be extended outwardly from the side of the car. Likewise, although I have shown the locking members as engaging wheel pedestals 6 of the road or carried vehicles, it will be obvious that the same may engage any other part of the road vehicle such as the under sill framing thereof or some special element fixed to the road vehicle and adapted for reception by the locking members. It is also to be understood that a pair of locking members is not essential for each wheel pedestal, but that only one pair may be employed for locking a vehicle, the forward wheel pedestals abutting against a single member C and the rear wheel pedestals abutting against an opposed member C'. In the event that it is desired to engage, for example, the under sill framing of the road vehicle instead of the wheel pedestal, the locking members may for this purpose be extended upwardly from the top of the carrier car.

Having described my invention, I claim:

1. The combination with a carrier car, of locking members extending outwardly from a side thereof for engaging a vehicle to be carried, spring means for holding said locking members outwardly extended, and means for pulling said locking members inwardly of the car against the action of said spring means.

2. The combination with a carrier car having a side sill, of recesses in said sill and locking means movable through said recesses for engaging a vehicle to be carried, spring means acting to force said locking means through said recesses outwardly of the car, and means for pulling said locking means through said recesses inwardly of the car against the action of said spring means.

3. The combination with a carrier car having a side sill, of recesses in said sill, a pair of longitudinally spaced locking arms pivoted in said sill and movable through said recesses, spring means for holding said arms extended outwardly of the car through said recesses, and means for pulling said arms inwardly of the car through said recesses.

4. The combination with a carrier car and a vehicle to be carried having a wheel pedestal, of a locking member on said car adapted to engage said pedestal, means for holding said member in engagement with said pedestal, and means for releasing said member from engagement with said pedestal.

5. The combination with a carrier car, of two locking arms pivoted thereto and extending outwardly therefrom at an angle toward each other, spring means acting to hold said arms outwardly extended from the car, and means for pulling said arms inwardly of the car against the action of said spring means.

6. The combination with a carrier car, of a winding drum fixed to said car, locking means movable outwardly from a side of the car for engaging a vehicle to be carried, spring means for holding said locking means outwardly extended from the car, connecting means between said locking means and drum, and means for rotating said drum.

7. The combination with a railroad carrier car, of a plurality of locking members pivoted thereto, said members being spaced longitudinally of the car, spring means associated with each of said members and acting to force the same outwardly from the car, and means for retracting said members inwardly of the car against the action of said spring means.

8. The combination with a carrier car, of a pair of substantially V-shaped locking members pivoted in a side of the car and movable in a horizontal plane, spring means acting to force said members outwardly of the car, and means for retracting said members inwardly of the car against the action of said spring means.

9. The combination with a railroad carrier car having a center sill and a side sill, of a winding drum fixed to said center sill, recesses in said side sill, a pair of spaced substantially V-shaped locking members pivoted to said side sill at opposite ends of said recesses and movable therethrough, spring devices associated with each of said members and acting to force the same outwardly of the car through said recesses, a flexible connection between each of said members and said drum, and means for rotating said drum.

10. The combination with a railroad flat car having a side sill, an opening or openings in said sill, substantially V-shaped locking members pivoted in said sill adjacent the opposite ends of said opening or openings and movable therethrough, spring devices for holding said members outwardly extended from the car, and means for retracting said members inwardly of the car.

11. The combination as specified in claim 6 in which said means for rotating said drum comprises a shaft disposed longitudinally of the car and connected to the drum, a second shaft disposed transversely of the car and geared to the first mentioned shaft, and a hand lever connected to said second shaft and disposed at the side of the car.

JOSEPH C. BONNER.